United States Patent Office 3,015,671
Patented Jan. 2, 1962

3,015,671
BICYCLOOCTENE DERIVATIVE AND PROCESS OF PRODUCING SAME
Homer J. Sims, Philadelphia, Pa., assignor to Rohm & Haas Company, Philadelphia, Pa., a corporation of Delaware
No Drawing. Filed Sept. 21, 1960, Ser. No. 57,369
5 Claims. (Cl. 260—491)

This invention deals with a specific bicyclooctene as a new composition of matter. It further deals with a method for the preparation of this specific bicyclooctene.

The compound of the present invention is 1,3,3,4,5,6-hexachloro-2-keto-7-acetoxy-[2.2.2]-bicyclooctene-5. The acetoxy group has been located on position 7 of the bicyclooctene nucleus, but it is not entirely certain whether this group is located at position 7 or 8. In any case, the present invention contemplates both possibilities.

The compound of the present invention is prepared by reacting pentachlorinated phenylhypochlorite with vinyl acetate.

The pentachlorinated phenylhypochlorite reactant may be used as such or it may be prepared in situ in the reaction medium. If the latter embodiment is preferred, one mixes approximately equimolecular amounts of pentachlorinated phenol and an alkylhypochlorite in the reaction medium. The alkyl group in the hypochlorite may contain from 1 to 18 carbon atoms, preferably 4 to 8 carbon atoms. While the alkyl group may exhibit any of the various isomeric arrangements, the tertiary configuration is preferred. Typical embodiments include t-butyl hypochlorite, hexyl hypochlorite, t-octyl hpyochlorite, and dodecyl hypochlorite.

It is frequently preferable to prepare the pentachlorinated phenylhypochlorite in situ in the reaction medium, as a matter of convenience, and, also, because some of the contemplated hypochlorites tend to be somewhat unstable. For reasons not entirely understood there is no observable reaction if less than six chlorine atoms are present in the chlorinated phenylhypochlorite reactant.

The present process involves a substantially equimolecular reaction between the aforementioned reactants. It is, however, frequently desirable to employ an excess of vinyl acetate. This assures high yields of desired product and also serves as a solvent. If a solvent is desired, other than an excess of vinyl acetate as previously mentioned, there may be employed t-butanol, carbon tetrachloride, ethyl ether, benzene, and the like. The solvent, of course, should be organic, volatile, and inert.

The present reaction is conducted in a temperature range of about 20° to 120° C., preferably 55° to 95° C. The product is a crystalline solid which is isolated by cooling the reaction mixture and filtering or by evaporating the solvent or excess reactant as the case may be. If desired, the product may be recrystallized from ethanol, aqueous ethanol, or other suitable solvent.

The compound of the present invention is useful as a fungicide particularly when applied against *Stemphylium sarcinaeforme* and *Monilinia fructicola* in usual amounts and according to standard techniques. Concentrations of about 0.1% by weight in a commercial carrier are quite effective in this respect. The present compound also exhibits herbicidal activity particularly against dicotyledonous plants especially in post-emergence applications. The product is also useful to impart fire resistance to polyesters.

The present compound, as well as the method for its preparation, may be more fully understood from the following example which is offered by way of illustration and not by way of limitation. Parts by weight are used throughout.

*Example*

There are added to a reaction vessel 12 parts of pentachlorophenyl hypochlorite and 30 parts of vinyl acetate. The reaction mixture is heated to reflux for 1½ hours after which the excess vinyl acetate is removed under aspirator vacuum. There is then added to the residue 15 parts of ethanol. The mixture is refrigerated overnight and filtered, yielding the crystalline product which has a melting point of 137° to 142° C. The product contains 31.23% carbon (31.04% theoretical); 1.64% hydrogen (1.56% theoretical); and 54.30% chlorine (55.01% theoretical). The product is identified as 1,3,3,4,5,6-hexachloro-2-keto-7-acetoxy-[2.2.2]-bicyclooctene-5.

I claim:
1. The compound, 1,3,3,4,5,6-hexachloro-2-keto-7-acetoxy-[2.2.2]-bicyclooctene-5.
2. A method for preparing 1,3,3,4,5,6-hexachloro-2-keto-7-acetoxy-[2.2.2]-bicyclooctene-5 which comprises reacting in the range of about 20° to 120° C. pentachlorinated phenylhypochlorite with vinyl acetate.
3. A method according to claim 2 in which the reaction is conducted in a temperature range of about 55° to 95° C.
4. A method according to claim 2 in which the pentachlorinated phenylhypochlorite is prepared in situ from pentachlorinated phenol and an alkylhypochlorite in which the alkyl group contains from 1 to 18 carbon atoms.
5. A method according to claim 2 in which the pentachlorinated phenylhypochlorite is prepared in situ from pentachlorinated phenol and a t-alkylhypochlorite in which the alkyl group contains from 4 to 8 carbon atoms.

No references cited.